US006944186B2

(12) United States Patent
Zaun et al.

(10) Patent No.: US 6,944,186 B2
(45) Date of Patent: Sep. 13, 2005

(54) MPEG RE-MULTIPLEXER HAVING MULTIPLE INPUTS AND MULTIPLE OUTPUTS

(75) Inventors: David Brian Zaun, Cherry Hill, NJ (US); Jeffrey P. Viola, Glen Mills, PA (US); Stephen M. Iaquinto, Doylestown, PA (US)

(73) Assignee: General Instrument Corporation, Horsham, PA (US)

( * ) Notice: Subject to any disclaimer, the term of this patent is extended or adjusted under 35 U.S.C. 154(b) by 980 days.

(21) Appl. No.: 09/736,947

(22) Filed: Dec. 14, 2000

(65) Prior Publication Data

US 2001/0024456 A1 Sep. 27, 2001

Related U.S. Application Data

(60) Provisional application No. 60/170,531, filed on Dec. 14, 1999.

(51) Int. Cl.[7] .................................................. H04J 1/00
(52) U.S. Cl. ........................ 370/487; 374/485; 374/486; 725/135; 725/136
(58) Field of Search ................................ 370/537, 474, 370/486, 487, 489, 490; 725/78, 81–86, 90–91, 109, 135–136

(56) References Cited

U.S. PATENT DOCUMENTS

| 5,754,783 A | | 5/1998 | Mendelson | |
|---|---|---|---|---|
| 5,835,493 A | | 11/1998 | Magee | |
| 5,909,468 A | * | 6/1999 | Lawrence | .................. 375/295 |
| 6,002,687 A | * | 12/1999 | Magee et al. | ................ 370/394 |
| 6,233,238 B1 | * | 5/2001 | Romanowski et al. | ....... 370/389 |
| 6,351,471 B1 | * | 2/2002 | Robinett et al. | ............ 370/468 |
| 6,408,436 B1 | * | 6/2002 | de Haas | ...................... 725/86 |

FOREIGN PATENT DOCUMENTS

| WO | 99/14955 | 3/1999 |
|---|---|---|
| WO | 99/37048 | 7/1999 |

OTHER PUBLICATIONS

International Preliminary Examination Report, dated Apr. 8, 2002.
Written Opinion from International Preliminary Examination Authority, dated Dec. 19, 2001.
C.T. Cartwright: "Issues in Multiplex and Service Management in Digital Multichannel Broadcasting", International Broadcasting Convention, GB, London, Sep. 1997, pp. 308–313, XP–000668937.

* cited by examiner

*Primary Examiner*—Wellington Chin
*Assistant Examiner*—Mark Mais
(74) *Attorney, Agent, or Firm*—Steven L. Nichols; Ronald P. Kananeri; Rader, Fishman & Grauer PLLC

(57) ABSTRACT

A re-multiplexer module for use in a packet processing system used in cable television headend devices generates two or more output streams from two or more MPEG input transport streams. The re-multiplexer module includes an input processing portion that receives a plurality of input data streams containing packet data, a plurality of packet buffers to store the packet data, an output processor that selectively multiplexes the data packets in the packet buffers, and a host processor that controls the operation of the input processing portion and the output processing portion.

37 Claims, 5 Drawing Sheets

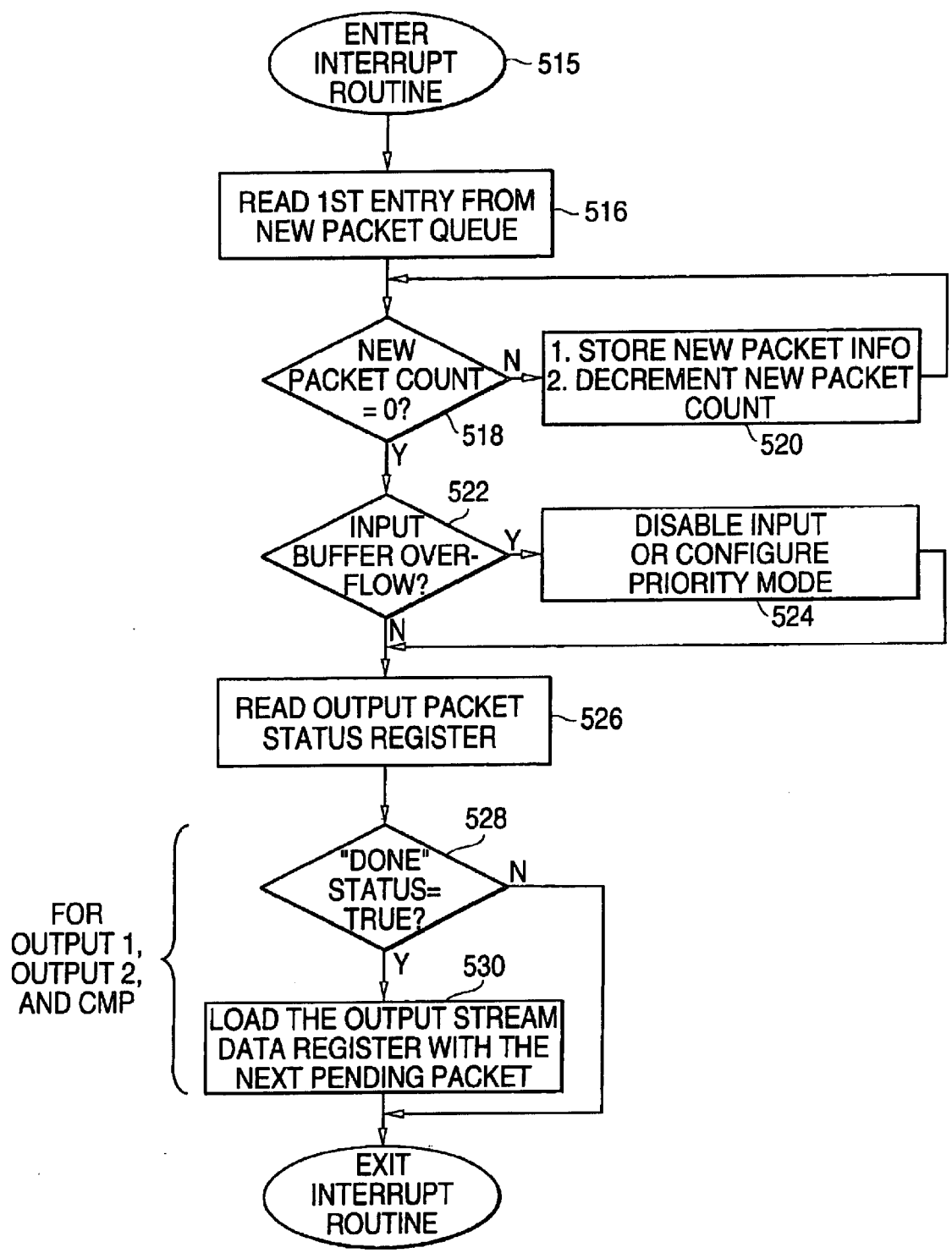

MPEG RE-MULTIPLEXER HAVING MULTIPLE INPUTS AND MULTIPLE OUTPUTS

This application claims the benefit of Provisional appl. No. 60/170,531, filed Dec. 14, 1999.

TECHNICAL FIELD

The present invention relates to the field of signal multiplexing, and more particularly to a packet processing system for use in a digital cable television headend for re-multiplexing high-speed video, audio, and data signals.

BACKGROUND OF THE INVENTION

Re-multiplexers are often used in cable television systems for efficient data transmission from a content source to a consumer. The content source usually provides the cable operator with programs via one or more input transport streams, often in the form of MPEG transport streams. The simplest way to transmit the programs to the consumer would be for the cable operator to simply transmit all of the input transport streams it receives to a terminal at the consumer's location. However, this method would unnecessarily waste output bandwidth because not every consumer would be given access to every program in the transport stream.

Currently known MPEG re-multiplexers can obtain programs from multiple input transport streams and re-multiplex them into a single output stream containing selected programs, thereby preserving output bandwidth. However, there are some applications where it is desirable to generate two or more output streams from the input streams. There is presently no known re-multiplexer that can construct more than one output stream from multiple input streams.

There is a need for a re-multiplexing device that can generate multiple output streams from multiple input streams.

SUMMARY OF THE INVENTION

Accordingly, the present invention is directed to a re-multiplexer module that generates two or more output streams from two or more input streams. The re-multiplexer module includes an input processing portion that receives a plurality of input data streams containing packet data, a plurality of packet buffers to store the packet data, an output processor that selectively multiplexes the data packets in the packet buffers, and a host processor that controls the operation of the input processing portion and the output processing portion.

In one embodiment, the inventive re-multiplexer module is designed for use in a packet processing system and includes one or more interfaces to interact with other components in the system.

BRIEF DESCRIPTION OF THE DRAWINGS

FIG. 5 is a flowchart illustrating an interrupt service routine used by the module of FIG. 1.

DETAILED DESCRIPTION OF THE PREFERRED EMBODIMENTS

Figure 1:
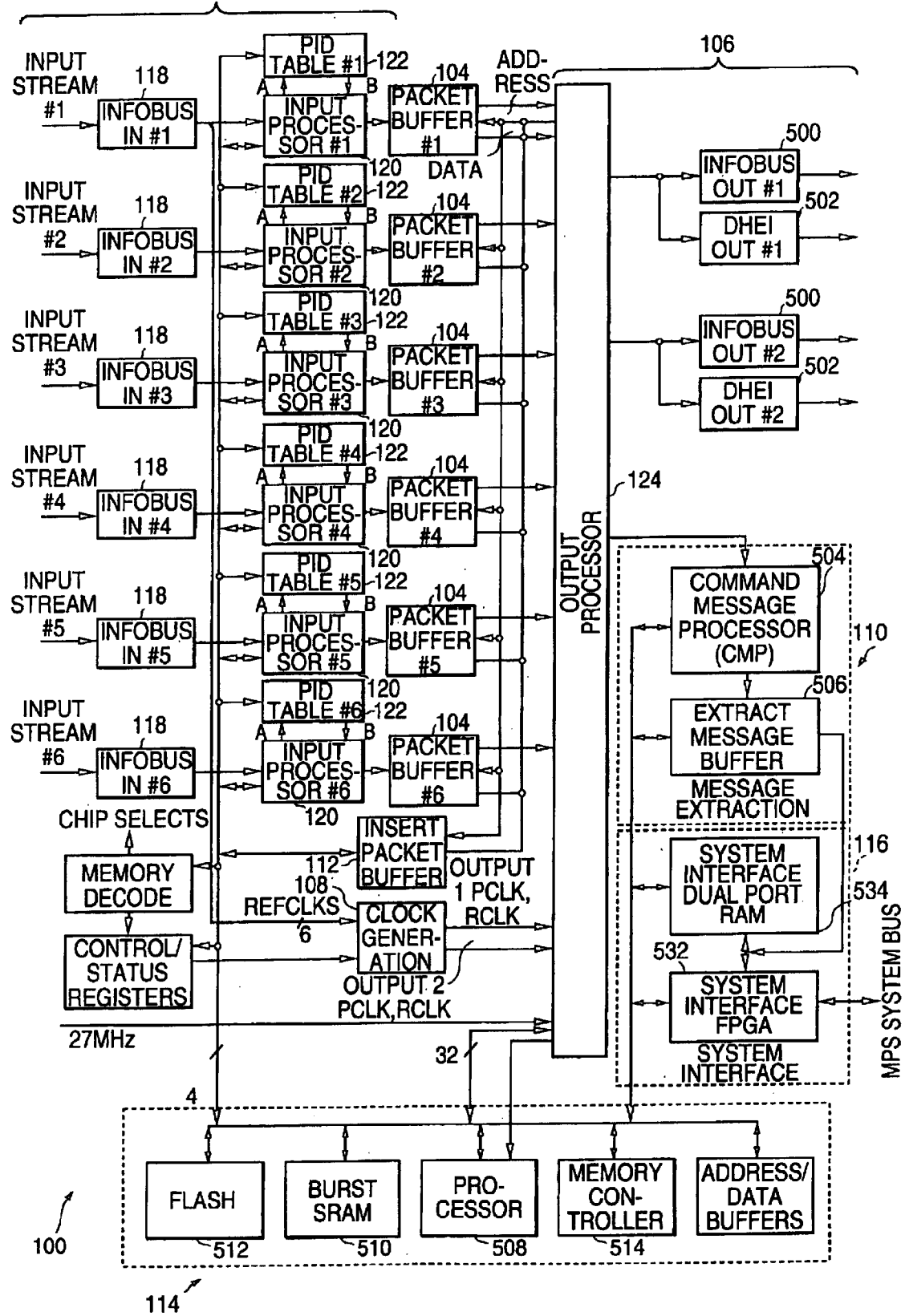
FIG. 1 is a block diagram of a re-multiplexer module according to the present invention.

FIG. 1 is a block diagram illustrating one embodiment of the re-multiplexing module 100 according to the present invention. The remultiplexing module 100 can be used as one component in a packet processing system in conjunction with other functional modules, such as an system controller or integrated backplane to create a reconfigurable processing element supporting high-speed transport of video, audio and data signals for digital cable television headends. In the description below, it is assumed that the signals are in an MPEG-2 format, but it is to be understood that the inventive system can be used to process signals in other compatible formats without departing from the scope of the invention. Further, although the example below receives six MPEG-2 input transport streams and generates two independent MPEG-2 output transport streams, the inventive system can support and generate any number of inputs and/or outputs.

In general, the inventive re-multiplexing module 100 accepts multiple input transport streams and generates new, independent output transport streams containing selected programs from the input streams. In addition to the re-multiplexing function, the inventive system also allows message extraction from all of the input streams and message insertion into all of the output streams.

As shown in FIG. 1, the inventive system 100 includes an input processing ("IP") section 102, one or more packet buffers 104, an output processing ("OP") section 106, a clock generator 108, message extraction section 110, packet inserter 112, a host controller 114, and system interface 116. Each of these portions will be described in greater detail below.

The input processing section 102 includes a backplane input interface circuit 118, an input processor 120, and a packet identifier (PID) filter table 122 for each input data stream. The input processor 120 can be implemented as, for example, a field programmable gate array or a programmable logic device. In this example, there are six input interfaces 118, PID filter tables 122, and input processors 120, so this embodiment can accept six separate MPEG-2 input streams. The six input streams can be asynchronous and can have different information rates. The input processing section 102 is designed to accept the input streams, drop undesired packets, and store the accepted packet data, an input timestamp, and control information in the packet buffers, where they are presented to the output processor.

The input packet data sent to the input interface circuits 118 in the input processing section 120 can be clocked and re-clocked using discrete, high-speed logic and sent to a corresponding input processor 120.

Figure 2:
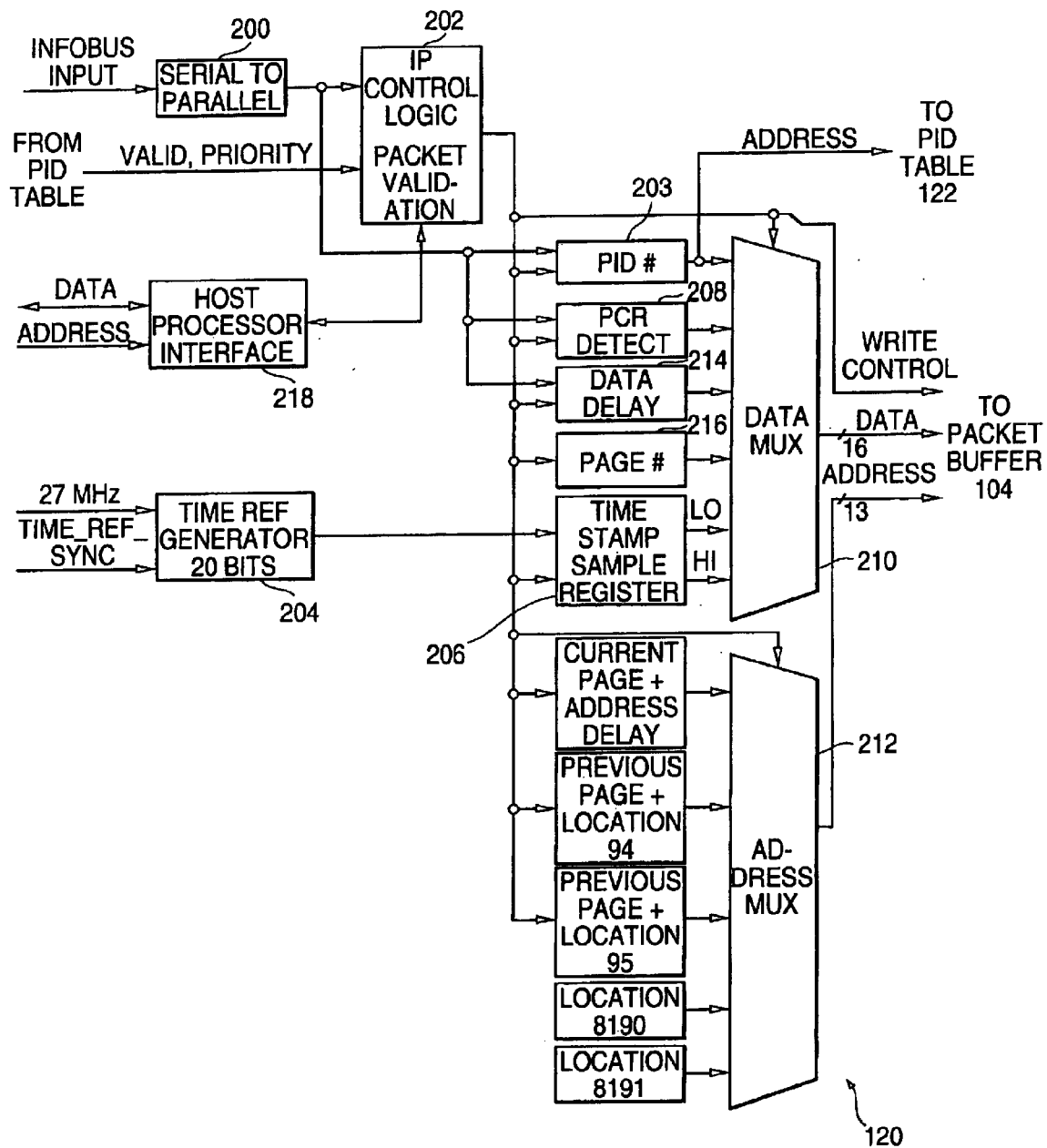
FIG. 2 is a block diagram of an input processor in the module of FIG. 1.

FIG. 2 is a representative diagram illustrating the components of the input processor 120 for one channel, which receives the input data from one input interface circuit 118. Functionally, the input processor 120 performs all of the required front-end packet data processing before the data is stored in the packet buffers 104 thereby eliminating the need for software to carry-out these operations. Generally, the input processor 120 functions may include serial-to-parallel conversion of the inputs from the input interface circuits 118, filtering and dropping any packets that are not selected to be output in one of the output streams or to be extracted, and checks for and discards invalid MPEG packets in the input stream. The input processor 120 also may identify and flag packets having valid program clock reference (PCR) data to reduce the processing load on the output processor; this is conducted by checking whether an adaptation field exists in an MPEG packet input to the input processor and, if one exists, checking the status of a PCR flag bit in the adaptation field. The input processor 120 may also generate input timestamps used for PCR correction, write desired packets into the packet buffer for output processing, write timestamps and other packet information required by the output processor into the packet buffer, and act as a control/status interface to the CPU.

Referring to FIG. 2 in more detail, input data is sent to a serial-to-parallel converter 200, which converts the serial input stream from the input interface 118 to 8-bit parallel data. This conversion simplifies the input processor 120 timing and control. Each input interface 118 contains four signals: PDATA, PSYNC, PCLK, and RCLK, where PCLK is synchronous with PDATA and PSYNC. A byte clock is derived from the PCLK signal in the input interface 118 by dividing PCLK by eight. The byte clock drives the datapath logic.

The converted data from the serial-to-parallel converter 200 is then sent to an input processor (IP) control logic block 202, which generates all of the required control and timing signals for the other processing elements in the input processor 120. One function of the IP control logic 202 is to validate input packets in the input data stream. More particularly, the IP control logic 202 extracts the PID number from the MPEG of the input packets in the 8-bit parallel data and sends the PID number to the address lines of the PID table 122 as well as a PID number buffer 203. If the PID table 122 returns a "valid" bit, either alone or with a "priority" bit if the IP control logic 202 is in a priority mode, the packet will be considered validated and send to the packet buffer 104 for storage. The details of the valid and priority bits will be described in greater detail below with respect to PID filtering.

The input control logic 202 also checks the incoming packet data for proper MPEG packet length. More particularly, when a sync signal is detected (i.e., when PSYNC=1) coincident with a data byte of 0×47, a byte counter (not shown) in the input control logic 202 is initialized and then increments with each clock of PCLK. If the next sync event occurs before the byte counter reaches a predetermined number of bytes (e.g., 188 bytes), then the IP control logic 202 considers the packet length invalid, discards the packet, and asserts an error bit that is readable by the host processor 114. If, however, the sync event is detected immediately after the byte counter reaches the predetermined value, the input control logic considers the packet the correct size and is therefore available for re-multiplexing. Note that this packet length test can also be incorporated into "input active" circuitry at the input interfaces 118 for detecting valid data at each input. In this case, an "input active" status bit is available to the processor 114 and can also be monitored via a LED on the re-multiplexer module 100.

Note that because the input processor 120 writes data to the packet buffer 104 as the data is received, the IP control logic 202 will not detect if the packet length is correct until the end of the packet. As a result, a page counter in the packet buffer 104 will not be incremented if the packet length is incorrect, and the page corresponding to the defective packet will by overwritten in the buffer by the next valid input packet received. Also, input packets containing an asserted transport error bit can be discarded via an optional mode controlled by the host processor 114. The transport error bit can be asserted by equipment, such as an encoder, that processes the MPEG stream and that can detect an error in the MPEG packet before it reaches the re-multiplexer module. If the transport error bit in the IP control logic block 202 is set and a transport error is detected, writing to the packet buffer 104 will be disabled (e.g., by not asserting a write enable signal), and the packet having the transport error bit will not be written into the packet buffer 104.

FIG. 2 also shows a time reference generator 204 in the input processor, which generates a time stamp for each valid input packet and stores it in a time stamp sample register 206. The time stamp is used by PCR correction circuitry in the output processor, to calculate the time that the input packet takes to pass through the re-multiplexer module. To calculate the time stamp in this example, a snapshot is taken of a 20-bit time reference running at 27 MHz when the last byte of a packet has been received by the input processor 120. This time stamp is generated at the end of each packet to avoid putting any minimum data rate restrictions on the inputs.

Next, PCR detection block 208 in the input processor 120 monitors input packets for a valid PCR field and writes a PCR flag to the packet buffer 104. Because PCR timestamp reads will only be necessary from packets containing valid PCR fields, the output processing portion 106 uses the PCR flag information to minimize the number of read operations that it must perform from the output processor by highlighting the location of the valid PCR fields via the PCR flags. To detect the location of valid PCR fields, the PCR detector 208 first checks the PCR flag bit in an adaptation field in the packet (in this example, this field is at byte 4, bit 5) for a 1 bit. The PCR detector 208 then checks two scramble control bits in the packet for a 00, indicating that the data is not scrambled. If the scramble control bits indicate that the packet is scrambled, the PCR bit is invalid and the packet is discarded. If the data is not scrambled and the PCR flag=1, then the packet will be marked as a PCR packet by setting a selected bit in a packet buffer location assigned for PCR packet identification purposes.

The input packet data and address data is directed to the packet buffers via a data multiplexer 210 and address multiplexer 212 under the control of timing and control circuitry. As can be seen in FIG. 2, the data multiplexer 210 receives PID number data, the PCR detector output, page number data, and the input timestamp, while the address multiplexer 212 receives location information. Because the packet buffer must accommodate the input timestamp, PCR flag, the PID number and the page number for each packet as well as the packet itself, the write control logic provided by the IP control logic block 202 preferably operates at twice the packet word rate so that it can service more than one output and to ensure that the additional control information, such as the timestamp and the PCR flag, is read for each packet in its entirety. The write control logic also interleaves the control data with MPEG packet data. One possible storage scheme involves storing the timestamp with its associated packet, after the 94-word packet block, and storing the PCR flag, page number, and PID number in the last two locations of the packet buffer 104. In this example, when the last word of the packet buffer 104 (in this example, location 8191) is written, the dual port RAM (DPRAM) used for each packet buffer generates an interrupt signal and sends it to the output processor.

A data delay register 214 also sends a signal to the data multiplexer 210 to control the flow of packet data to the packet buffer 104. In one embodiment, the data delay register 214 causes the input processor 210 to delay the packet data by four clock cycles to perform error check and validate packets before any data can be written to the packet buffer. The data delay allows error checking and validation to occur without any data loss. If, after error checking and validation, the packet is allowed to be written to the packet buffer via the delayed data path created by the data delay register.

A page number generator 216 may also provide a signal to the data multiplexer 210 corresponding to a page number for packets stored in the packet buffer 104. More particularly, the page number generator 216 maintains a byte counter for each input packet. When a sync is detected, an 8-bit byte counter in the page number generator is loaded with a zero value and then is counted upward as each new byte is received. In one embodiment, the lower 7 address bits in the packet buffer contains a delayed version (e.g., delayed by 4 clocks) of the 8-bit byte counter without the least significant bit. The least significant bit is not used in the packet buffer 104 because the input processor writes 16-bit words in the packet buffer 104 at one time; because the packet buffer stores two bytes in the same location, every other count of the 8-bit byte counter is not required for reporting. Once a validated packet has been stored in the packet buffer 104, the page number generator 216 increments the page number. The page number itself is the upper 6 bits of the packet buffer 104. The lower 7 address bits and the upper 6 bits together form the 13 bits of address space in the packet buffer.

As can also be seen in FIG. 2, the input processor 120 has a host processor interface 218 that acts as a control and status register interface to the re-multiplexer module host processor 114. The re-multiplexer host processor 114 controls the packet data flow operation and reads the input processor 120 status as packets travel through the re-multiplexer module 100.

Figure 3:
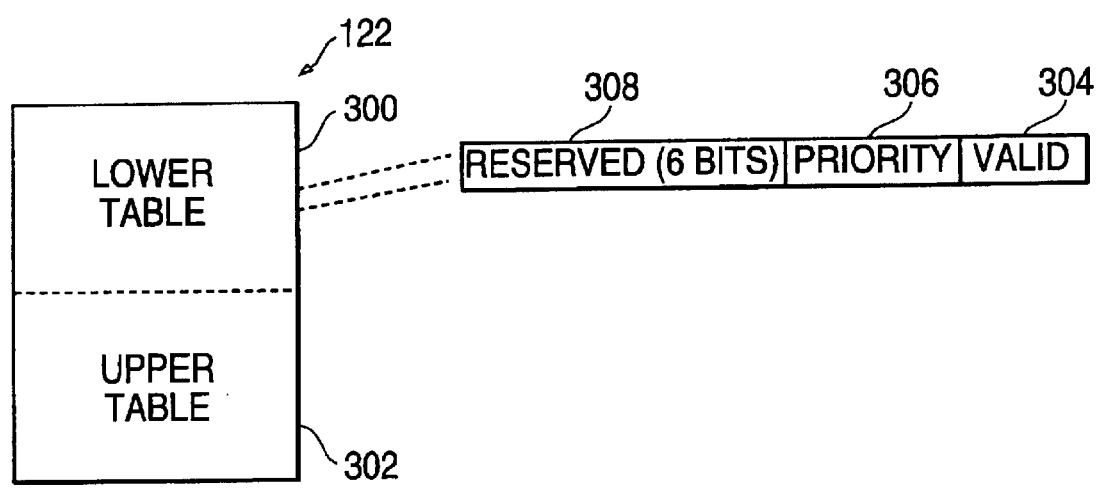
FIG. 3 is a block diagram of a packet identifier table in the module of FIG. 1.

As mentioned above, the input processing portion 102 also includes a PID filter table 122 associated with each input stream. An example of a PID filter table 122 used in the inventive re-multiplexer is shown in FIG. 3. The PID filter table 122 stores values against which input packets are evaluated and stored or dropped. In one embodiment, the PID filter tables 122 are stored in multi-port accessible memories, such as a dual-port RAM. As can be seen in FIG. 3, the PID filter table 122 can be partitioned into two separate tables, a lower table 300 and an upper table 302, to allow dynamic reconfiguration. The lower and upper tables 300, 302 act interchangeably as an active PID table or a pending PID table. In this example, the lower table 300 acts as the active PID and the upper table 302 acts as the pending PID table. Each of the individual possible PID values (in this example, 8192 possible values) maps to a single particular location in the active PID table, and each location in the active PID table contains a valid bit 304, a priority bit 306 and 6 reserved bits 308.

PID values from MPEG packets in the input stream are sent to the address lines of the PID filter table 122. The PID filter table outputs data corresponding to each address contains re-multiplexing information for the specific PID at that address. If the valid bit 304 for the PID value in a given packet is cleared, that packet is dropped and not written to the packet buffer 104. If, however, the valid bit 304 is asserted, the packet is stored in the packet buffer 104 to await re-multiplexing. The priority bit 306 in the packet provides an additional level of packet filtering by distinguishing between valid packets. Priority mode occurs when the packet data is reaching a maximum rate, and the command to activate priority filtering can be received by the input processor 120 from software. In priority mode, a packet having the priority bit 306 asserted indicates that the packet has a higher priority than other valid packets and should therefore be passed through the re-multiplexer 100 before valid packets without an asserted priority bit.

The status of the tables 300, 302 can be switched between active and pending status via software control by the host processor 114, of the most significant bit of the PID table 122 which acts as a control bit. While the input processor 120 is operating from the active table, the host processor 114 on the re-multiplexer module 100 can modify the pending table, thereby allowing modifications in the PID table without interrupting input processor operation. When the host processor 114 chooses to put the pending table into effect, it modifies the most significant bit in the PID table 122, which acts as a control bit. The input processor 114 then registers the control bit with the PCLK associated with that data stream so that, on the next sync event for that data stream, the PCLK switches the statuses of the two tables 300, 302, turning the pending table into the current active table and turning the active table into the current pending table. The control bit becomes the most significant bit of the input processors interface to the PID table, and the host processor can read this bit directly from an input processor status register. Once the host processor modifies the most significant bit in the PID filter table, it should not attempt to write new table data until it validates that the status has indeed been switched.

The packet buffers 104 provide the interface from the six independent input processors 120 to a single synchronous interface of an output processor 124 in the output processing portion 106. The packet buffer 112 can be divided into types: an input packet buffer and an insert packet buffer. The input packet buffer can be the packet buffers 104 shown in FIG. 1 for holding data from all accepted packets. Each input stream preferably has a dedicated input packet buffer, such as an 8K×16 DPRAM, each of which acts as a circular buffer. In one embodiment, the accepted packet data is stored in blocks of 256 bytes, allowing 64 packets to be stored at one time. The minimum input buffer size preferably accommodates any anticipated packet jitter in the re-multiplexer and may include an additional safety margin to accommodate program streams having data bursts.

Input timestamp data, used for PCR correction, can also be stored in the input packet buffer 104 after the last data word of each input packet. A portion of the input packet buffer, such as the last two locations in the buffer, can be used for storing information that will be provided to the output processor 124. More particularly, once a new packet has been validated and stored in the input packet buffer 104, the input processor 120 writes the PCR flag, current page number, and PID number for that packet into the last two locations of the input packet buffer 104. The PCR flag minimizes the number of status reads conducted by the output processor software because the software will read the timestamp information for a given packet only if the PCR flag for that packet is set. The page number notifies the output processor of the new packet's location, and the PID number of the packet is used by the output software in the host processor for re-multiplexing and message extraction.

Generally, the output software in the host processor 114 allows the host processor to make re-multiplexing and extraction decisions based on the PID number identifying the MPEG stream and to pass control information to corresponding hardware to perform any desired operations. When the PID number is written to the selected location in the input packet buffer 104, the input packet buffer portion may automatically generate an interrupt that indicates to the output processor that a new packet has been stored in the input packet buffer. The interrupt clears when the output processor 124 reads from the PID location in the input packet buffer 104. To prevent valid input data from being lost, the input packet buffer 104 requires the output processor to read the page number and PID number information corresponding to the new packet before it is overwritten with the information corresponding to the next packet stored in the input packet buffer 104.

The other packet buffer type is an insert packet buffer 112, which can be, for example, an 8K×16 DPRAM divided into two 4K blocks, one for each output (assuming that there will be two output streams). In one embodiment, an input port of the packet buffer 112 is coupled to the host processor 114, and the output port is coupled to a packet buffer bus of the output processor 124. Packets designated as "insert packets" are read the same way as other packet data when selected by the output processor 124, but they are inserted into the output stream to customize the output.

Figure 4:
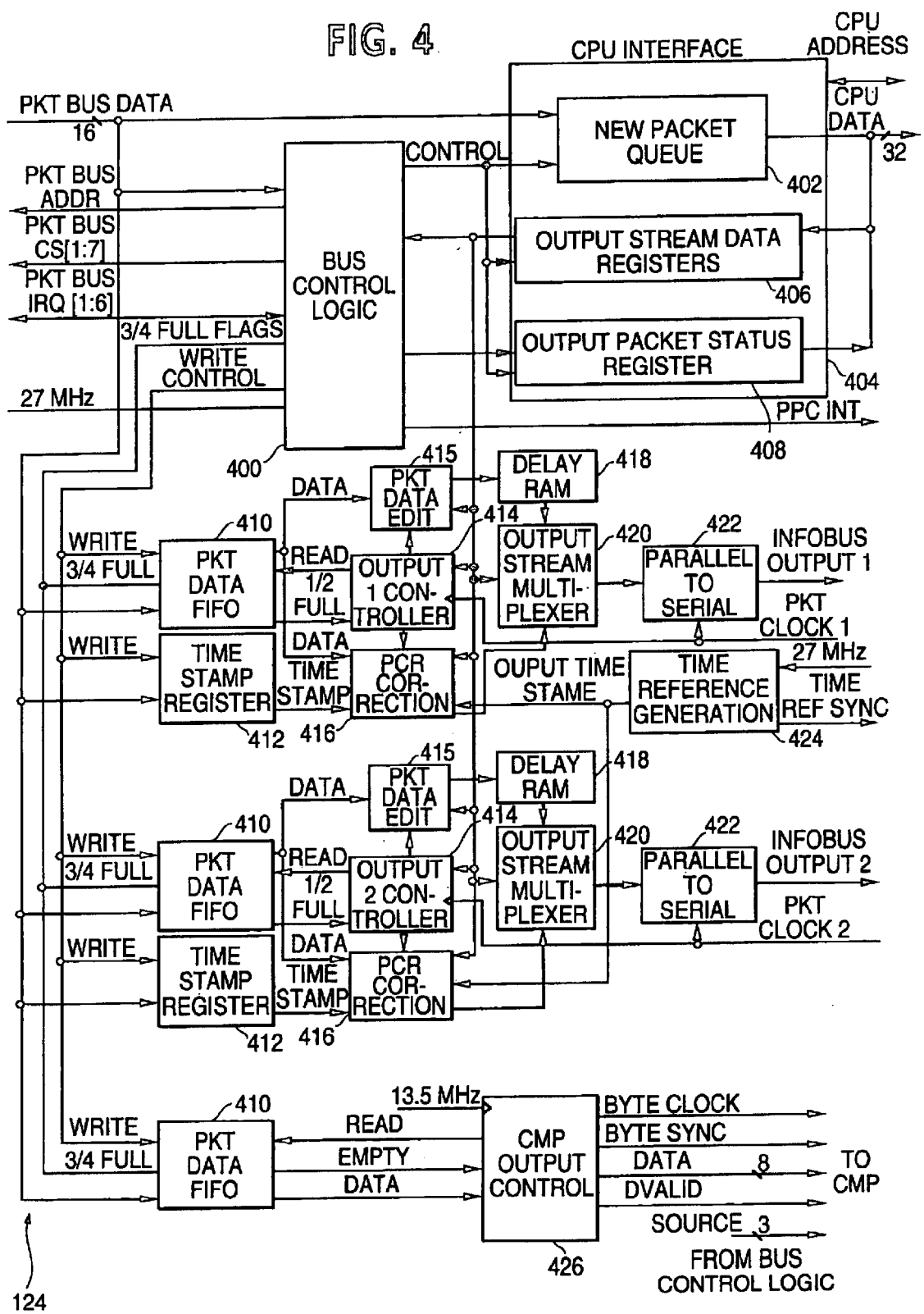
FIG. 4 is a block diagram of an output processor in the module of FIG. 1.

FIG. 4 is a block diagram illustrating the components of the output processor 124 in the inventive re-multiplexing module 100. In general, the output processor 124 is a FPGA conducts the required hardware tasks to generate two or more output streams from the data stored in the packet buffers 104. More particularly, the output processor 124 reads the selected packet data from the input packet buffers and/or the insert packet buffer 112, performs PID remapping, program clock reference (PCR) correction and any other desired or required packet editing, and may also insert new PID fields and other MPEG control information into the output streams as directed by the CPU. The output processing section then generates two or more independent high-speed transport multiplex (HSTM) output streams incorporating the selected packet data. The output processing section also monitors the packet buffers 104, 112 to check for any newly arrived packets and to communicate to the host processor 114 of the presence of any new packets as well as any required packet identifying information. The output processing section also sends the packet data as a filtered packet stream to the message extraction portion 110. Each of the components in the output processor 124 will be described below with reference to FIG. 4.

The output processor 124 includes a bus control logic block 400 that controls much of the output processor's operation. The bus control logic 400 responds to packet buffer interrupts, reads new packet information from the interrupting packet buffers, and generates addresses and chip selects to access data in the packet buffer as instructed by the output stream data registers. The chip selects in particular are used by the output processor 124 to read selected individual "chips" in the packet buffers 104. The bus control logic 400 also provides the status of the re-multiplexed outputs and a CMP output from the message extraction portion 110 to the host processor 114, controls the data flow from the packet buffers 104, 112 of the re-multiplexed outputs, generates the interrupt used by the host processor 114 for its interrupt service routine and controls the phases of the time domain multiplexed packet bus. The interrupt service routine is conducted by the host processor 114 in response to an interrupt signal from the bus control logic, which is triggered at regular intervals, and involves performance of re-multiplexing and extraction operations before directing processing operation back to the start of the re-multiplexer code.

The bus control logic block 400 operation is conducted as follows. The bus control logic 400 first responds to packet buffer interrupts by monitoring an interrupt line from each of the input packet buffers 104. Whenever an interrupt is detected from any of the input packet buffers 104, the new packet information for that packet in the buffer is read and inserted into a circular buffer, which is designated as a new packet queue 402, in a host processor interface 404. The new packet queue preferably has a two page capacity. The bus control logic clears the interrupt by reading a second word at a designated interrupt location in the input packet buffer 104. Note that if more than one interrupt occurs at one time, the interrupts will be serviced by the bus control logic 400 from the lowest numbered input to the highest. The host processor's interrupt service routine (ISR) signal is generated by a counter in the output processor 124 that creates a signal having a period that is slightly larger than the period of a packet received by the re-multiplexer at a maximum input and output rate. For example, if the maximum input and output rate of the re-multiplexer is 52 Mbps, the ISR signal generated by the host processor 114 has a period that is the same as the period of a packet received at 53 Mbps. This difference ensures that the ISR will service all of the hardware's input and output requirements by finishing its processing between interrupts.

The bus control logic 400 generally controls the manner in which the packets are read from the input and insert packet buffers 104, 112. The reading process is generally conducted in three phase nhases. The host processor's ISR signal is divided into 94 read slots, and each read slot is divided into three time domain multiplexed phases. Each phase contains one read cycle form the packet buffer 104. The first phase includes the reading of data other than the packet data itself (e.g., timestamps, PID value, page number, PCR flag, CMP packet data). The second and third phases are used to read data stored in the packet buffers. These phases will be described in greater detail below.

The order in which the data is read during the first phase is dictated by the specific data needed to read the packet and the data's relative priority. In this example, timestamps have the highest priority are read first. New packet header information is considered lower priority and CMP packet data is considered the lowest priority. The timestamps are assigned the highest priority in the first phase to ensure that the PCR correction calculation will be completed by the time the resultant data is to be inserted into the output packet data stream. As explained above, packets having a valid PCR filed are detected and flagged by the input processor 120. Because the input processor 120 will report whether or not a given packet has a valid PCR, the bus control logic in the output processor only has to read the timestamps for packets identified as PCR packets, skipping over packets containing information other than a PCR. As a result, the first phase requires fewer timestamp reads than known processors, thereby increasing the speed of the CMP data output because it shares the same bus controller read phase. A prompt and quick CMP data output is desirable because delays in the CMP data output could cause a backup in the input packet buffer due to an unread packet, which can cause a buffer overflow error.

If there are no timestamp reads during the first phase, the bus control logic will service any active packet buffer interrupts. Note that servicing of new packet interrupts is also given a high priority because the PID, page information, and PCR flag for a given packet will be overwritten if the delay between the time the packet is stored in the input packet buffer and the time that the packet PID and location is read completely out of the packet buffers new packet information addresses exceeds the period of the input packet.

If no other data is required, a pending data word can be output to the command message processor (CMP). As noted above, prompt output of CMP data prevents overflow errors in the input packet buffer due to backups in the buffer caused by unread packets. Any time saved by not reading data from the packet buffer for overhead requirements makes more time available for reading out packets to be sent to the CMP, thereby reducing or eliminating delays for CMP data outputs.

The second and third phases are used to read packet data stored in the input packet buffers and to write the data to packet data first-in-first-out (FIFO) buffers in the output processor 124. The second phase is used to generate a first output stream and the second phase is used to generate a second output stream, assuming that the output processor generates two output streams. If the re-multiplexer is designed to generate more than two output streams, the bus control logic 400 causes the buffered data to be read in additional phases so that each phase corresponds to one output stream. Because the packet buffer read operations in this example read one word at a time, it will take about 94 reads to transfer an entire packet from the input packet buffer into the output transport stream. In this example, the data read out of the input packet buffers is based on the output stream data register 406 in the host processor interface 404.

The host processor interface 404, which has been referenced briefly above, is used for communication between the output processor (and specifically the bus control logic block 400 in the output processor 124) and the re-multiplexer CPU. More particularly, the CPU interface controls control and status registers as well as interface logic. The output processor's host processor interface 404 shown in FIG. 4 contains the new packet queue status register 202, an output stream data register 406, and an output packet status register 408. The new packet queue status register 402 provides the re-multiplexer CPU with information related to any packets that have been received by the input processor in between interrupt service routine events. The first word in the new packet queue status register may include a "new packet count" field, which the host processor 114 uses to determine the number of read operations that will be needed to transfer all of the new packet information.

As can be seen in the Figure, host processor data is also written to output stream data registers in the host processor interface 404 to control the content of the output streams and the CMP's source data. More specifically, the output processor 124 uses the information from the output stream data registers to read the data from the input packet buffers 104, perform PCR correction, replace the existing PID with the new output PID number corresponding to the new output packet, and set the transport error flag. Although there are three registers in the output packet status register, the CPU sees the three registers as a single write location.

The host processor interface 404 also includes output packet status registers 408, which output information to the host processor 114 relating to the status of the two or more re-multiplexed output streams and the CMP path, which travels from the packet buffers, through the output processor, to the control processor. Loading of the output stream data register is controlled by the host processor 114 via the current packet information and a "done" indicator stored in the output packet status register.

As noted above, a packet data FIFO 410 is included in the front end of each output stream data path. Each FIFO 140 is preferably relatively small (e.g., about 16 words deep) compared to the input packet buffers. The FIFOs 410 are included in the output processor 124 because the time division multiplexing clock, which controls the phases of the read operations from the input packet buffers, and the output stream packet clock, which controls the data rate of the output multiplexing, are asynchronous. The data is read from the packet data FIFO 410 at a fraction of the output stream packet clock rate. The FIFO 410 may also include a "full" flag, such as a ¾ full flag and/or a ½ full flag, which indicates to the bus control logic the fullness of the FIFO 410. The fullness of the FIFO 410 is monitored because the rate at which packets are sent to the output processor may be faster than the rate that the packets are output into the output stream. The ½ full flag may also be used by the output controller 414 to remove data to be inserted into the output data stream from the output processor 124.

The output processor 124 also includes a timestamp register 412 associated with each output stream to store the input timestamp data from the input packet buffer. The timestamp information in the timestamp register will be used for PCR correction of packets having a valid PCR field, which will be explained in greater detail below.

An output packet clock is used to determine a byte read rate and is input into the output controller 124 by the clock generator 108, as shown in FIG. 1. The output controller logic 414 controls and provides the timing for the circuits in the output processor 124 that conduct packet data editing, PCR correction, and output stream multiplexing. The specific manner in which each circuit is controlled by the output controller 124 will be described in greater detail below with each individual circuit.

First, the output controller for each data stream sends an output to a packet data edit block 415. The packet data edit (PDE) circuitry 415 is used to overwrite data in the MPEG packet. More particularly, the PDE circuit edits the PID number, transport error indicator, and legal time window offset information. During this process, the output packet's PID value is replaced with a new PID value that is passed to each output processor output by the host processor. This PID replacement process is conducted for all of the packets sent to the output processor 124. Note that because the final PID remapping is performed in the output processor 124, after the packets have entered separate and independent data paths, one input packet ID stream can be assigned different PID values (i.e., they have unique identifiers) in each of the two output streams. Packets that are to be sent to the CMP will not require PID re-mapping by the PDE circuitry because these packets will use the PID and source value, which identifies the source from which the packet is input, to identify the packets from the multiple input sources.

Re-multiplexing changes the temporal location of the packets, making it necessary to check a legal time window offset field with respect to each packet. Because of this, the packet is checked for the presence of this offset field and, if appropriate, the legal time window valid flag is cleared.

Software in the host processor 114 checks the fullness of the input packet buffers for any violations of re-multiplexer packet jitter specifications. If the input packet buffer 104 is filled to a predetermined level, the packets stored in the input buffers 104 are assumed to be corrupted. The re-multiplexing software may also check for other error conditions and can instruct the output processor to set the transport error indicator bit in the MPEG header in all packets associated with any one of the outputs. Once the error condition has been resolved, the software will instruct the output processor 124 to resume normal packet processing once the error condition has been resolved.

A PCR correction block 416 for each output is coupled to the FIFO, time stamp register, and controller to correct for PCR jitter occurring due to the variable amount of time in which each packet spends in the packet buffer 104. To remove PCR jitter, the PCR correction block first determines the total amount of time that a packet requires to pass through the entire re-multiplexer module 100. The is done by calculating the difference between the input timestamp, which is applied when a packet first enters the packet buffer, and the output timestamp, which is applied as the packet is removed from the packet data FIFO in the output processor 124. The difference between the timestamps represents the actual delay introduced to that packet.

When the PCR value is changed, the change directly affects downstream decoders because any change in the difference between the PCR and the timestamp will change the amount of time that the packet will spend in the input packet buffer 104. To take advantage of this, the host processor 114 can add a constant to the actual delay value to generate a PCR correction value. The PCR correction value is defined as the difference between the actual delay value and the constant value, and this PCR correction value can be positive or negative. As a result, the PCR correction value allows the re-multiplexing module 100 to adopt a different multiplexing strategy than the original encoder.

A delay RAM block 418 and an output stream multiplexer block 420 are also included for each output stream. The delay RAM 418 provides additional time to allow the PCR correction block 420 to generate the modified PCR. More particularly, the delay RAM block 418 delays all packet data from the packet data edit block 415 for a predetermined number of bytes, regardless of whether the packet contains a PCR field. The output stream multiplexer, which is coupled to the delay RAM and to the PCR correction block, selects whether to obtain data from the delayed path (through the delay RAM 418) or a PCR correction path (which bypasses the delay RAM 418) based on the PCR bit in the output stream data register 406. Control of the timing for the output stream multiplexer is generated by the output controller 414.

The final stage in the output processor 414 for each output stream is a parallel-to-serial converter block 422. The converter generally uses the packet clock, as can be seen in FIG. 4, to convert the parallel information from the output stream multiplexer into a serial stream. After conversion, the serial output stream is sent to an output interface 500 and external equipment interface 502 as shown in FIG. 1. The output interface 500 acts as the output interface to other modules within the packet processing system, while the external equipment interface circuitry 502 acts as the output interface to equipment outside the MPS.

As mentioned above, the output processor 414 includes a time reference generator 424. The output processor's time reference generator 420 is the same as the time generator in the input processor except that the output processor time reference generator acts as the master counter that controls synchronization between the output processor 414 and the input processor. In one example, when the output processor's time reference generator 424 reaches a terminal count, it sends a synchronization load pulse to slave counters in the input processor 120 to reload all of the counters with 0's. The output timestamp is sampled when the first word is read from the FIFO.

A CMP output control block 426 has a byte wide interface with the output processor 414 and includes a clock, data, sync, data valid, and a 3 bit source. Unlike the output interface 500 and the external equipment interface 502, which provide a constant data stream, the interface in the CMP output control block 426 only transmits data when valid data is available. The 3-bit packet buffer source data is also transmitted to the CMP output control block to distinguish between packets having the same PID but are from different source streams.

Turning now to the message extraction portion 110 of the re-multiplexer module 100, as can be seen in FIG. 1, the message extraction portion 110 allows the re-multiplexer to perform message extraction instead of or in conjunction with other decryption or extraction modules in the packet processing system. The message extraction section is coupled to the output processor 124 and extracts selected messages, such as a Program Association Table (PAT), Program Map Table (PMT) or individual packets from the output streams. The extracted packets or messages are stored in the extract buffer, and the contents of the extract buffer memory can be examined by the remultiplexer's CPU or sent directly to other MPS modules (not shown) via the system interface.

Generally, a control message processor (CMP) 504 conducts the actual message extraction, while an extract message buffer 506 stores the extracted messages. The CPU designates output packets as possible candidates for message extraction by setting the "valid bit" in the appropriate PID table. The output packets designated by the host processor are stored in the input packet buffers along with the packets to be re-multiplexed.

The host processor 114 notifies the output processor if a packet is to be sent to the CMP during a re-multiplexer interrupt service routine. The output processor 124 reads the data from the output packet buffer when a slot is available. The data read from the packet buffer is then sent to the CMP 504 with a clock and an enable signal. Data will be stalled through the output processor 124 and the CMP 504 whenever a new word is not read. The rate at which the CMP 504 reads a complete packet, including timestamps, PID and source location reads results in a packet stream data rate into the CMP 504 that is approximately 90% of the data rate of the packet bus clock. The PID value of the packets sent to the CMP 504 preferably includes the packet's original PID along with a value indicating the stream source of the packet. The stream source value can be a 3-bit address identifying the packet buffer used by a particular input stream, thereby allowing the CMP 504 to differentiate between packets having the same PID value but were input via different input streams.

The CMP 504 can examine multiple PID streams simultaneously, if needed. The CMP itself examines incoming packet data to determine if the PID is active. If the PID is active, the message in the packet data is stored in the extract message buffer 506. When the CMP 504 detects that a complete message has been received, the CMP 504 generates an interrupt signal. At various time intervals, the host processor 114 queries the CMP 504 to determine the location and size of all messages that have been received by the CMP 504 since the last time the CMP 504 was accessed by the host processor. The host processor 114 will then notify other modules in the MPS, via the MPS system bus in the system interface 116 that a message is available in the extract message buffer 506.

The extract message buffer 506 is also connected directly to the MPS system bus (not shown) through the system interface. The system interface 116 writes the messages to off-board destinations directly from the extract message buffer and then notifies the re-multiplexer host processor 114 when it is finished writing messages from the extract message buffer, leaving the buffer available to receive new messages. The re-multiplexer host processor 114 then informs the CMP 504 of the sections available in the extract message buffer 506 are available for receiving new messages.

The CMP 504 can also act as a packet extractor. In this example, packets are extracted based on the 4-byte MPEG header. Masking may also be provided in the CMP 504. If requested by the re-multiplexer host processor 114, an entire packet can be stored in the extract message buffer, allowing the host processor 114 to check the fields in each payload that may be needed for re-multiplexing. The CMP 504 may also extract the legal time window offset field for any or all active packets to be used in PCR correction. The host processor 114 accesses the extract message buffer 506 through the CMP 504, as can be seen in the Figure, and can read portions of any packet or any extracted message in the extract message buffer and determine whether the information in the packet or message is unwanted or redundant. The host processor 114 will then notify the CMP 504 that the packet or message can be cleared once it has been read. The interface between the CMP 504 and the extract message buffer 506 is preferably time-division multiplexed to allow host processor 114 read operations.

The packet insertion function, which is performed by the output processor 124 and insert packet buffer 112 in conjunction with the host processor 114, inserts messages in any of the output streams. The message insertion function allows the re-multiplexer to produce MPEG compliant output transport streams while keeping its data processing load at a manageable level. Insert messages are sent to the re-multiplexer over the system bus. The source of the messages will typically be the controlling element in the packet processing system (not shown). An insertion queue manager executing in software packetizes the messages and schedules the packet insertion into the output streams. In the re-multiplexer interrupt service routine, the software also checks for the availability of a packet whenever one of the output queues is empty. Insert packets are read the same way as the input packet data when the are selected by the CPU. The insert packet buffer 112 itself can be a DPRAM that is divided into multiple blocks, one block associated with each output. In this example, the input packet buffer is an 8K×16 DPRAM divided into two 4K blocks, one for each output.

The host processor 114 section of the re-multiplexer module controls all of the remultiplexing decisions in the module. One possible host processor 114 may contain a 200 MHz processor 508, 1 Mbyte of main memory (e.g., a synchronous burst static RAM) 510, 2 Mbytes of flash memory 512 for non-volatile program storage, a universal asynchronous receiver/transmitter, a memory/interrupt controller 814 implemented in a high-speed complex programmable logic device, and associated support logic.

The host processor 114 section in this example acts as the host processor and provides the data used to filter out unwanted packets, directs the output processing hardware in creating the re-multiplexed outputs and CMP 504 streams, monitors the input data for overflow conditions, generates values used for PCR correction, selects the output rates, and provides status and control interfaces to the major processing elements, as described above, in the re-multiplexing module. The host processor 114 also communicates with the MPS system controller (not shown) via the system interface 116.

The host processor 114 includes an interrupt and memory controller 514, which performs address decoding and generates handshake signals that are needed to control the processor's access to other elements of the re-multiplexer module 100. The interrupt and memory controller 514 can be in the form of a high-speed programmable logic device. The memory controller also generates the control signals needed for storing programs in flash memory and executing programs out of the high-speed burst memory and can also function as an interrupt controller.

The memory controller 514 also monitors the address bus and control lines to determine which portion of the re-multiplexer module 100 is being accessed by the host processor. In addition to performing address decoding, the controller may also recognize burst transfers and provide the control signals to the burst RAM 510 to access program data, provide control signals to flash transceivers to allow 64-bit reads and writes, generate wait states for the devices in the re-multiplexer module 100, and steers data to appropriate byte lanes within the processor databus.

FIG. 5 is a flowchart illustrating one example of an interrupt service routine that is conducted in the re-multiplexer software. The interrupt service routine is initiated at step 515 by a signal generated by the output processor and sent to the host processor 114. Once the interrupt service routine is initiated, the hardware in the output processor 124, which reads the page and PID number information from the packet buffers and sends the information to the host processor 114, is checked to determine the source and PID of any packets stored in the input packet buffers since the previous interrupt service routine at step 516. If new packets are detected at step 518 (that is the new packet count does not equal 0), the 3-bit source address and PID are used to determine the destination (e.g., any one of the output streams, the CMP, or any combination) for the new packets at step 520. If the new packets are re-multiplexed, the new packets are placed on the new packet queue with information corresponding to its location in the packet buffer, its final PID and its PCR correction constant. If the new packet is to be sent to the CMP 504, the new packet is placed on the CMP queue with only its packet location. This example assumes that the output processor has one output packet queue that is latched for the host processor 514 and another output packet queue that gathers new packet information during the interrupt service routine.

Next, the host processor 114 collects data from any new packets that have entered the input packet buffers during the previous interrupt service routine period. Because, in this example, the PPC INT signal occurs at a faster rate than the fastest possible input, no more than one packet can be received in any of the input packet buffers during one ISR period. The collected data also allows the host processor 114 to detect input packet buffer overflow at step 524.

As noted briefly above, the fullness of each of the packet buffers 104 should be monitored by the host processor 114. In one example, the software checks the packet buffers 104 for an "almost full" condition, a "half full" condition, and an "almost empty" condition. During normal operation, the input packet buffer 104 will contain few packets. If the input packet buffer passes the half-full point, the input processor 120 is instructed to check the priority bit in the packets and filter non-priority packets, as noted above with respect to priority mode operation. The priority mode is preferably maintained until the packet buffer 104 returns to an almost empty state.

If the packet buffer 104 continues to become increasingly full even during the priority mode and passes the "almost full" threshold, the packet input is turned off completely to prevent additional packets from entering the input buffers. When the remultiplexing software determines that the input buffer is almost empty, it allows input packets to enter the input packet buffer again. When the input is turned back on, the input processor resumes writing to the input packet buffer at the location it was writing when the input was turned off. Also, if the processing mode of an input stream changes, the system controller for the packet processing system (not shown) is notified. If an actual input packet buffer overflow is detected, the input processor will be turned off by the host processor and the output processor sets the transport error indicator in any outgoing packets.

The re-multiplexing software also monitors the number of packets in each output queue at step 526. Any fluctuations in the number of packets in the output queues determines the maximum packet jitter, and from this information a value is selected as a maximum allowable number of packets in each output queue. Whenever this value is exceeded by any output packet queue, an output overflow flag the software is enabled and any new packets will be dropped until the output queue is empty.

Next, the hardware is checked to determine if any output stream data register information is needed for any of the outputs or for the CMP 504. Any information is passed for the oldest entry in the output queue within the host processor software. If the output queue is empty and an insert packet is available in the insert packet buffer, the location of that insert packet is passed into the output stream at step 530. Otherwise, the location of the null packet is passed into the output stream.

If there is an input buffer overflow, the system disables the input or configures a priority mode to select which packets should be processed first. If there is no input buffer overflow or after the input is disabled or the priority mode is configured, the host processor 114 reads the output packet status register and checks whether the read operation is complete for each output stream and CMP. If the read operation is not complete, the next pending packet is loaded into the output stream data register and the interrupt service routine ends.

A system interface 116 links the re-multiplexer module to other modules (not shown) in the MPS system via a parallel system bus. Information that can be sent to the re-multiplexer include initialization and configuration parameters, processing commands, and messages to be inserted into the output stream. Information that can be sent by the re-multiplexer to other MPS modules include the re-multiplexer module status, processing errors, and extracted messages. Note that, in practice, most of the communication will be between the re-multiplexer module and the system controller module.

Parallel bus access is controlled by the system interface FPGA 532, and data being sent to or from the re-multiplexer module is stored in a dedicated DPRAM in the re-multiplexer module 534.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A re-multiplexer module for transmitting a plurality of output data streams from a plurality of input data streams, comprising:

an input processing portion that receives a plurality of input data streams containing data packets;

a plurality of packet buffers for storing data packets of said input streams;

an output processing portion that selectively multiplexes data packets from said plurality of buffers to generate at least two output data streams; and a host processor that controls the operation of the input processing portion and the output processing portions, wherein said module also extracts messages from said input data streams and selectively adds messages to any of said at least two output data streams.

2. The re-multiplexer module of claim 1, wherein the input processing portion includes a plurality of input interfaces and a plurality of input processors, each input interface receiving one of said plurality of input data streams and sending the input data stream to one of said plurality of input processors.

3. The re-multiplexer module of claim 1, wherein the input processing portion includes a plurality of packet identifier tables, each packet identifier table coupled to one of said input processors.

4. The re-multiplexer module of claim 3, wherein the packet identifier table includes an active table and a pending table, wherein the pending table can be modified while the input processing portion is operating from the active table.

5. The re-multiplexer module of claim 4, wherein the packet identifier table includes a switching mechanism that allows the host processor to switch the active table into a current pending table and switch the pending table into a current active table.

6. The re-multiplexer module of claim 3, wherein each input interface has a corresponding packet identifier table.

7. The re-multiplexer module of claim 1, wherein the packet buffer includes an input packet buffer that holds data from accepted packets in the input stream and an insert packet buffer that holds packet data that is to be inserted into the output stream.

8. The re-multiplexer module of claim 1, wherein the output processing portion includes an output processor having a bus control logic block that controls the manner in which packets are read from the plurality of packet buffers.

9. The re-multiplexer module of claim 8, wherein the output processing portion further comprises a message extraction portion that extracts selected messages from any of the plurality of the packet buffers.

10. The re-multiplexer module of claim 9, wherein the message extraction portion includes a control message processor that extracts messages from the output stream and a extract message buffer that stores the extracted messages.

11. The re-multiplexer module of claim 1, further comprising a system interface coupled to the output processing portion for linking the re-multiplexer module with other modules in a packet processing system.

12. The re-multiplexer module of claim 1, wherein the output processing section further comprises an interface coupled to the output processor for outputting the output data streams.

13. The re-multiplexer module of claim 12, wherein the interface includes at least one output interface to other modules in a packet processing system and a external equipment interface that acts as an output interface to devices outside of the packet processing system.

14. The re-multiplexer module of claim 13, wherein an output interface and a external equipment interface is provided for each output data stream.

15. A re-multiplexer module for transmitting a plurality of output data streams from a plurality of input data streams, the re-multiplexer module being configured for use in a packet processing system, comprising:

an input processing portion that receives a plurality of input data streams containing data packets, the input processing portion having a plurality of input interfaces, a plurality of input processors, and a plurality of packet identifier tables, each input interface and packet identifier table corresponding with one of said plurality of input streams;

a plurality of packet buffers for storing data packets of said input streams, each packet buffer receiving an input from one of said plurality of input processors;

an output processing portion that selectively multiplexes data packets from said plurality of buffers to generate at least two output data streams, the output processing portion having at least two output interfaces; and a host processor that controls the operation of the input processing portion and the output processing portion.

16. The re-multiplexer module of claim 15, wherein the input processing portion includes a plurality of packet identifier tables, each packet identifier table coupled to one of said plurality of input processors.

17. The re-multiplexer module of claim 16, wherein the packet identifier table includes an active table and a pending table, wherein the pending table can be modified while the input processing portion is operating from the active table.

18. The re-multiplexer module of claim 17, wherein the packet identifier includes a switching mechanism allowing the host processor to switch the active table into a current pending table and switch the pending table into a current active table.

19. The re-multiplexer module of claim 15, wherein the packet buffer includes an input packet buffer portion that holds packet data from accepted packets in the input stream and an insert packet buffer portion that holds packet data that is to be inserted into the output data stream.

20. The re-multiplexer module of claim 15, wherein the output processing portion includes an output processor having a bus control logic block that controls the manner in which packets are read from the plurality of packet buffers.

21. The re-multiplexer module of claim 20, wherein the output processing portion further comprises a message extraction portion that extracts selected messages from the output stream generated by the output processor.

22. The re-multiplexer module of claim 21, wherein the message extraction portion includes a control message processor that extracts messages from the output stream and a extract message buffer that stores the extracted messages.

23. The re-multiplexer module of claim 15, further comprising a system interface coupled to the output processing portion for linking the re-multiplexer module with other modules in a packet processing system.

24. The re-multiplexer module of claim 15, wherein the output processing section further comprises an output interface coupled to the output processor for outputting the output data streams.

25. The re-multiplexer module of claim 24, wherein the interface includes at least one output interface that acts as an output interface to other modules in a packet processing system and a external equipment interface that acts as an output interface to devices outside of the packet processing system, and wherein one output interface and one external equipment interface is provided for each output data stream.

26. The re-multiplexer module of claim 1, wherein said module assigns new Packet Identifiers (PIDs) to packets taken from one of said input data streams and added to one of said output data streams.

27. The re-multiplexer module of claim 1, wherein said input processing portion flags data packets having valid program clock reference (PCR) data.

28. The re-multiplexer module of claim 27, wherein said output processing portion extracts said PCR data from said flagged data packets.

29. The re-multiplexer module of claim 1, wherein said module has a priority mode in which packets having a set priority bit will be indicated as having a high priority than other valid packets and will be passed through the module before non-priority packets.

30. The re-multiplexer module of claim 1, wherein said messages comprise either Program Association Tables (PATs) or Program Mat Tables (PMTs).

31. The-multiplexer module of claim 15, wherein said module also extracts messages from said input data streams and selectively adds messages to said at least two output data streams.

32. The re-multiplexer module of claim 15, wherein said module assigns new Packet Identifiers (PJDs) to packets taken from one of said input data streams and added to one of said output data streams.

33. The re-multiplexer module of claim 15, wherein said input processing portion flags data packets having valid program clock reference (PCR) data.

34. The re-multiplexer module of claim 33, wherein said output processing portion extracts said PCR data from said flagged data packets.

35. The re-multiplexer module of claim 15, wherein said module has a priority mode in which packets having a set priority bit will be indicated as having a high priority than other valid packets and will be passed through the module before non-priority packets.

36. The re-multiplexer module of claim 31, wherein said messages comprise either Program Association Tables (PATs) or Program Mat Tables (PMTs).

37. A method of operating a re-multiplexer module to transmit a plurality of output data streams from a plurality of input data streams, comprising:

receiving a plurality of input data streams containing data packets;

storing data packets of said input streams;

selectively multiplexing stored data packets to generate at least two output data streams; and extracting messages from said input data streams and selectively adding messages to any of said at least two output data streams.

* * * * *